United States Patent
Ikezawa

(10) Patent No.: US 7,548,236 B2
(45) Date of Patent: Jun. 16, 2009

(54) IMAGE PROCESSING METHOD, IMAGE PROCESSING APPARATUS, IMAGE PROCESSING PROGRAM, AND STORAGE MEDIUM

(75) Inventor: Yoshiko Ikezawa, Fuchu (JP)

(73) Assignee: Olympus Corporation, Tokyo (JP)

( * ) Notice: Subject to any disclaimer, the term of this patent is extended or adjusted under 35 U.S.C. 154(b) by 597 days.

(21) Appl. No.: 11/141,184

(22) Filed: May 31, 2005

(65) Prior Publication Data

US 2005/0280644 A1    Dec. 22, 2005

(30) Foreign Application Priority Data

Jun. 17, 2004    (JP)    ............... 2004-179568

(51) Int. Cl.
*G06T 15/00*    (2006.01)
(52) U.S. Cl. ...................................... 345/419
(58) Field of Classification Search ........................ None
See application file for complete search history.

(56) References Cited

U.S. PATENT DOCUMENTS

| | | | | |
|---|---|---|---|---|
| 5,059,359 A | * | 10/1991 | Hull et al. .................... | 264/401 |
| 5,375,195 A | * | 12/1994 | Johnston ..................... | 345/630 |
| 5,850,463 A | | 12/1998 | Horii | |
| 5,854,850 A | * | 12/1998 | Linford et al. ............... | 382/128 |
| 5,864,640 A | * | 1/1999 | Miramonti et al. .......... | 382/312 |
| 5,933,151 A | * | 8/1999 | Jayant et al. ................. | 345/473 |
| 6,208,356 B1 | * | 3/2001 | Breen et al. .................. | 345/473 |
| 6,236,405 B1 | * | 5/2001 | Schilling et al. ............. | 345/582 |
| 6,271,847 B1 | * | 8/2001 | Shum et al. .................. | 345/418 |
| 6,381,346 B1 | * | 4/2002 | Eraslan ........................ | 382/118 |
| 6,502,583 B1 | | 1/2003 | Utsugi | |
| 6,504,546 B1 | * | 1/2003 | Cosatto et al. ............... | 345/473 |
| 6,556,196 B1 | * | 4/2003 | Blanz et al. .................. | 345/419 |
| 6,639,594 B2 | * | 10/2003 | Zhang et al. ................. | 345/426 |
| 6,750,873 B1 | * | 6/2004 | Bernardini et al. .......... | 345/582 |
| 6,809,728 B2 | * | 10/2004 | Terauchi et al. ............. | 345/420 |
| 6,825,850 B2 | * | 11/2004 | Wang et al. .................. | 345/582 |
| 6,834,119 B2 | * | 12/2004 | Chen ............................ | 382/154 |
| 6,919,892 B1 | * | 7/2005 | Cheiky et al. ................ | 345/473 |

(Continued)

FOREIGN PATENT DOCUMENTS

JP    6-325151    11/1994

(Continued)

OTHER PUBLICATIONS

English abstract of Japanese document JP-10-255066. Sep. 25, 1998.*

(Continued)

*Primary Examiner*—Peter-Anthony Pappas
(74) *Attorney, Agent, or Firm*—John C. Pokotylo; Straub & Pokotylo

(57) ABSTRACT

An image processing method includes creating a three-dimensional proto-model of a subject, creating a three-dimensional model of the subject by projecting to map a photographed image of the subject on the surface of the three-dimensional proto-model, displaying the three-dimensional model on the display, transforming or modifying the shape of the three-dimensional model, creating a two-dimensional modified subject image of the transformed or modified three-dimensional model, combining the two-dimensional modified subject image with the photographed image, and displaying the combined image as the modified photographed image on the display.

12 Claims, 9 Drawing Sheets

U.S. PATENT DOCUMENTS

| | | | |
|---|---|---|---|
| 7,027,054 B1* | 4/2006 | Cheiky et al. | 345/473 |
| 7,123,262 B2* | 10/2006 | Francini et al. | 345/473 |
| 7,184,049 B2* | 2/2007 | Ballin et al. | 345/473 |
| 7,239,321 B2* | 7/2007 | Berger | 345/473 |
| 7,456,842 B2* | 11/2008 | Kosolapov | 345/589 |
| 2002/0051006 A1* | 5/2002 | Katagiri et al. | 345/653 |
| 2002/0159628 A1* | 10/2002 | Matusik et al. | 382/154 |
| 2003/0034976 A1* | 2/2003 | Raskar et al. | 345/427 |
| 2003/0202691 A1* | 10/2003 | Beardsley | 382/154 |
| 2005/0280644 A1* | 12/2005 | Ikezawa | 345/419 |

FOREIGN PATENT DOCUMENTS

| | | |
|---|---|---|
| JP | 9-62865 | 3/1997 |
| JP | 10-255066 | 9/1998 |
| JP | 2003-302211 | 10/2003 |
| WO | WO 03/100728 | 12/2003 |

OTHER PUBLICATIONS

English abstract of Japanese document JP-09-062865. Mar. 3, 1997.*
Kentaro Kizaki, "Solid Base Three-Dimensional CAD Software VISI-CAD driven by Windows", *Nikkei Business Publications*, vol. 108, p. 64 (Nikkei CG, Japan, Sep. 1, 1995).
Notification of Reasons for Rejection for Japanese Patent Application No. 2004-179568, mailed Mar. 24, 2009 (4 pgs.) (with translation (4 pgs.)).

* cited by examiner

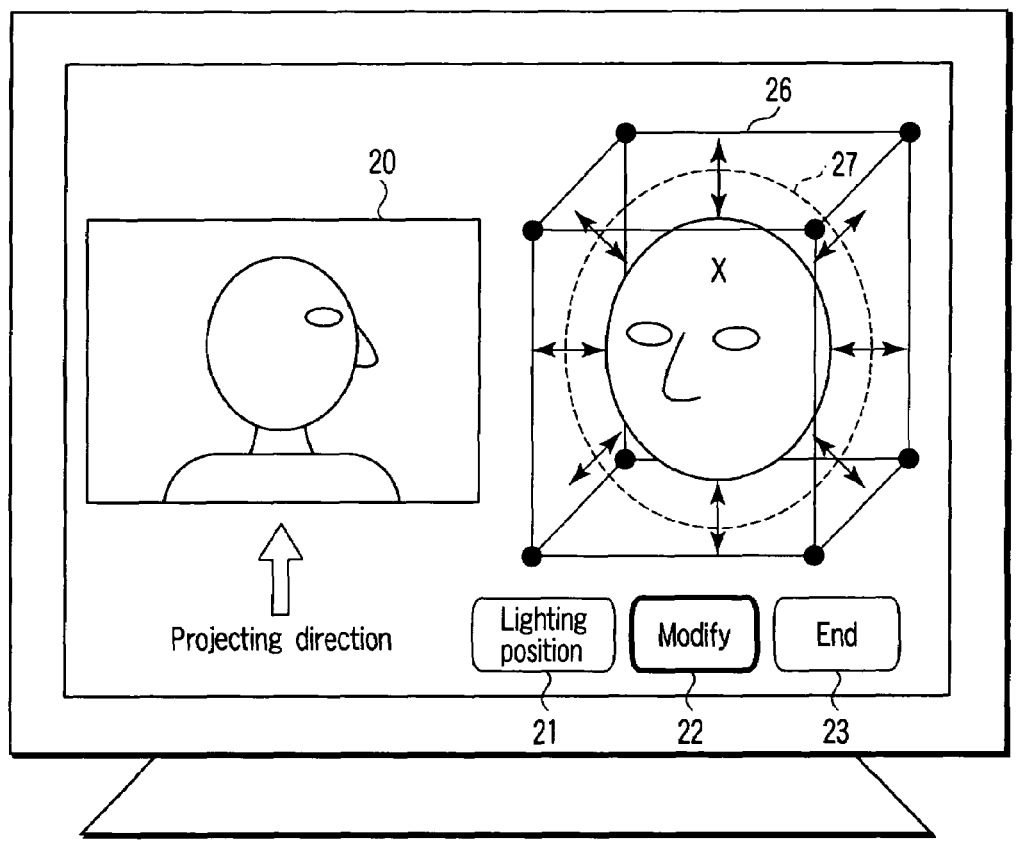
F I G. 11

IMAGE PROCESSING METHOD, IMAGE PROCESSING APPARATUS, IMAGE PROCESSING PROGRAM, AND STORAGE MEDIUM

CROSS-REFERENCE TO RELATED APPLICATIONS

This application is based upon and claims the benefit of priority from prior Japanese Patent Application No. 2004-179568, filed Jun. 17, 2004, the entire contents of which are incorporated herein by reference.

BACKGROUND OF THE INVENTION

1. Field of the Invention

This invention relates to image processing technology, and more particularly to the technique for modifying the image of a subject's face naturally.

2. Description of the Related Art

Various techniques for modifying the image of a person's face by image-processing have been known. Jpn. Pat. Appln. KOKAI Publication No. 9-62865 has disclosed a method of producing a natural, comfortable image of a child's face by combining the image of a man's face and the image of a woman's face. In addition, Jpn. Pat. Appln. KOKAI Publication No. 10-255066 has disclosed a method of modifying the image of a woman's face to obtain the image of a beautiful woman's face.

BRIEF SUMMARY OF THE INVENTION

According to a first aspect of the present invention, there is provided an image processing method used in an image processing apparatus which has a display for displaying an image and modifies a photo-graphed image, the image processing method comprising: creating a three-dimensional proto-model of a subject; creating a three-dimensional model of the subject by projecting the subject portion of a photographed image on the surface of the three-dimensional proto-model and mapping the subject image onto the surface of the three-dimensional proto-model; displaying the three-dimensional model of the subject obtained by mapping on the display; transforming or modifying the shape of the three-dimensional model of the subject displayed on the display; creating a two-dimensional modified subject image by projecting the image of the transformed or modified three-dimensional model of the subject in the direction opposite to the direction in which the photographed image is projected; combining the two-dimensional modified subject image obtained by projecting the image in the opposite direction with the photographed image; and displaying the combined image as the modified photographed image on the display.

According to a second aspect of the present invention, there is provided an image processing apparatus which has a display for displaying an image and modifies a photographed image, the image processing apparatus comprising: a three-dimensional model creating section which creates a three-dimensional proto-model of a subject; a projection section which projects the subject portion of a photographed image to map the image onto the surface of the three-dimensional proto-model of the subject; a display section which displays on the display a three-dimensional model of the subject obtained by mapping; a transforming section which transforms or modifies the shape of the three-dimensional model of the subject displayed on the display; an inverse projection section which creates a two-dimensional modified subject image by projecting the image of the three-dimensional model of the subject transformed or modified at the transforming section in the direction opposite to the direction in which the photographed image is projected at the projection section; an image combining section which combines the two-dimensional modified subject image obtained at the inverse projection section with the photographed image; and a result-of-process display section which displays the combined image at the image combining section on the display.

According to a third aspect of the present invention, there is provided an image processing program which is executed on an image processing apparatus that has a display for displaying an image and modifies a photographed image, the image processing program comprising: a three-dimensional model creating step of creating a three-dimensional proto-model of a subject; a projection step of projecting the subject portion of a photographed image to map the subject image onto the surface of the three-dimensional proto-model of the subject; a displaying step of displaying on the display a three-dimensional model of the subject obtained by mapping; a transforming step of transforming or modifying the shape of the three-dimensional model of the subject displayed on the display; an inverse projection step of creating a two-dimensional modified subject image by projecting the image of the three-dimensional model of the subject transformed or modified at the transforming step in the direction opposite to the direction in which the photographed image is projected; an image combining step of combining the two-dimensional modified subject image obtained in the inverse projection step with the photographed image; and a result-of-process displaying step of displaying the image combined in the image combining step on the display.

According to a fourth aspect of the present invention, there is provided a recording medium with an image processing program which is executed on an image processing apparatus that has a display for displaying an image and modifies a photographed image, the recording medium with an image processing program comprising: a three-dimensional model creating step of creating a three-dimensional proto-model of a subject; a projection step of projecting the subject portion of a photographed image to map the subject image onto the surface of the three-dimensional proto-model of the subject; a displaying step of displaying on the display a three-dimensional model of the subject obtained by mapping; a transforming step of transforming or modifying the shape of the three-dimensional model of the subject displayed on the display; an inverse. projection step of creating a two-dimensional modified subject image by projecting the image of the three-dimensional model of the subject transformed or modified at the transforming step in the direction opposite to the direction in which the photographed image is projected; an image combining step of combining the two-dimensional modified subject image obtained in the inverse projection step with the photographed image; and a result-of-process displaying step of displaying the image combined in the image combining step on the display.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 11 shows a 3D-model modifying screen;

DETAILED DESCRIPTION OF THE INVENTION

First Embodiment

In an image processing method according to a first embodiment of the present invention, a three-dimensional face image model is produced when a two-dimensional face image is modified. Then, the three-dimensional model is modified, thereby producing a two-dimensional modified face image. Hereinafter, the image processing method of the first embodiment will be explained.

Figure 1:
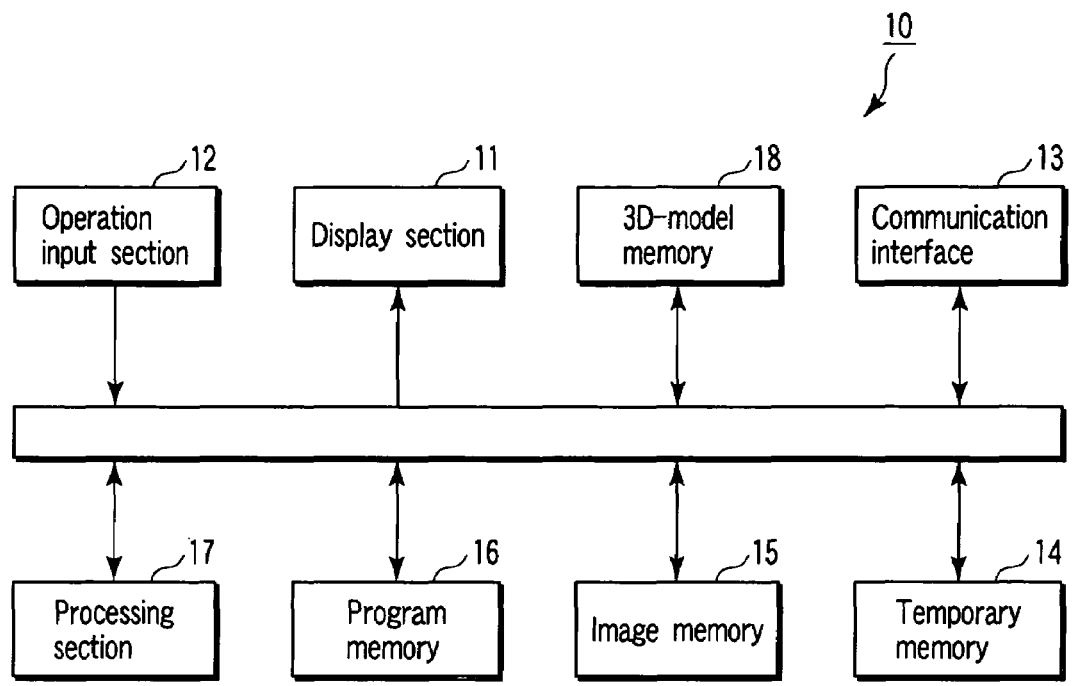
FIG. 1 shows the configuration of an image processing apparatus to which an image processing method according to a first embodiment of the present invention is applied.

FIG. 1 shows the configuration of an image processing apparatus 10 to which the image processing method of the first embodiment is applied.

The image processing apparatus 10 comprises a display section 11, an operation input section 12, a communication interface 13, a temporary memory 14, an image memory 15, a program memory 16, a processing section 17, and a 3D-model memory 18.

The display section 11 is a CRT or TFT liquid-crystal display which displays an image processing screen. The operation input section 12 is an input device, such as a keyboard or a mouse, which receives an operation input from the user. The communication interface 13 exchanges information, such as image data, with an external device.

The temporary memory 14 is a buffer memory which stores intermediate data and the like in image processing. The image memory 15 stores original images. The program memory 16 stores programs which control each function of the image processing apparatus 10. The processing section 17 supervises the entire operation of the image processing apparatus 10. The 3D-model memory 18 stores three-dimensional models (hereinafter, referred to as 3D models) used in image processing.

Figure 2:
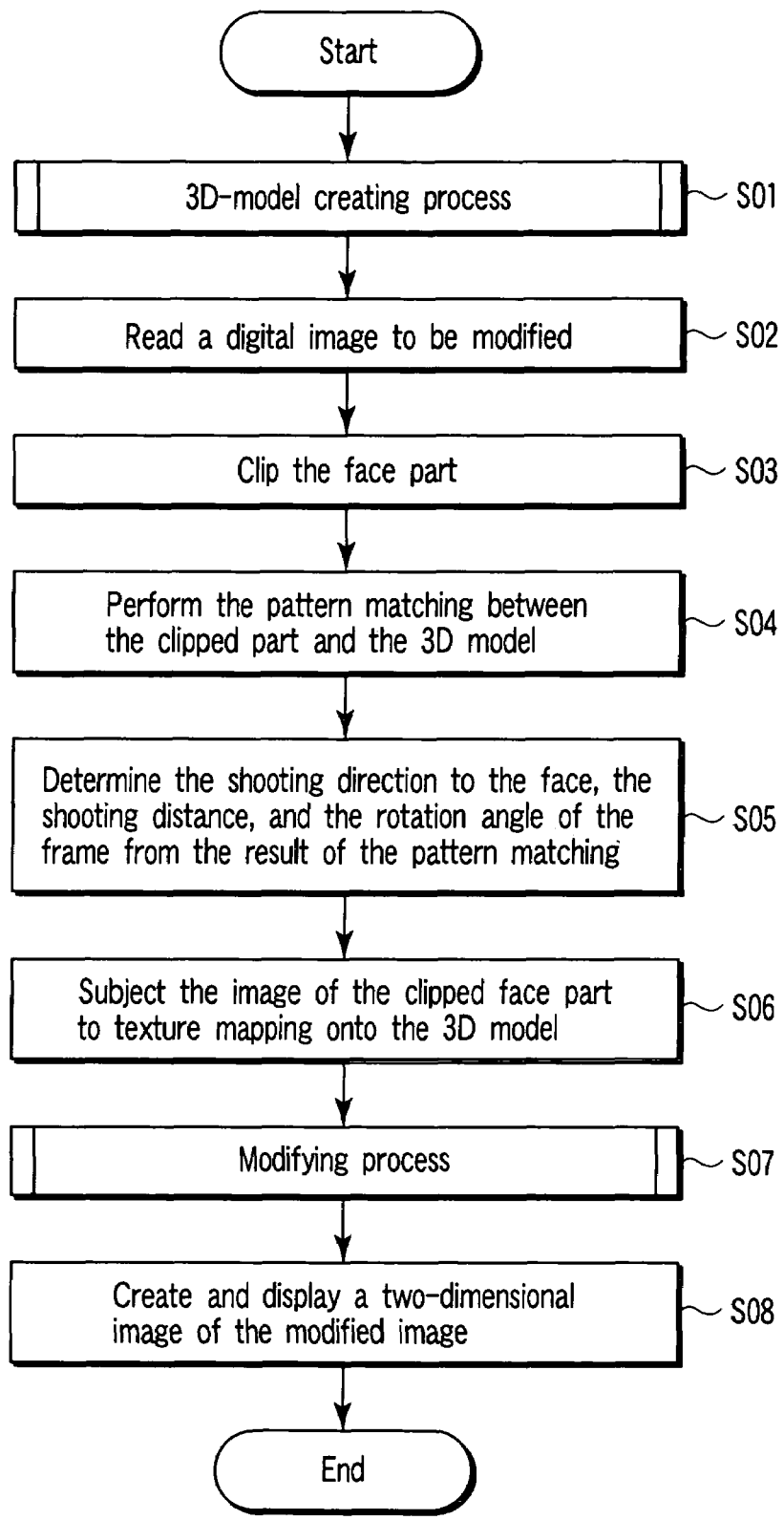
FIG. 2 is a flowchart to give an outline of the procedure for image processing.

FIG. 2 is a flowchart to give an outline of the procedure for image processing related to the first embodiment.

To prepare for image processing, the user carries out a 3D-model creating process (see FIG. 3) in step S01 of FIG. 2 for a person to be processed.

Figure 3:
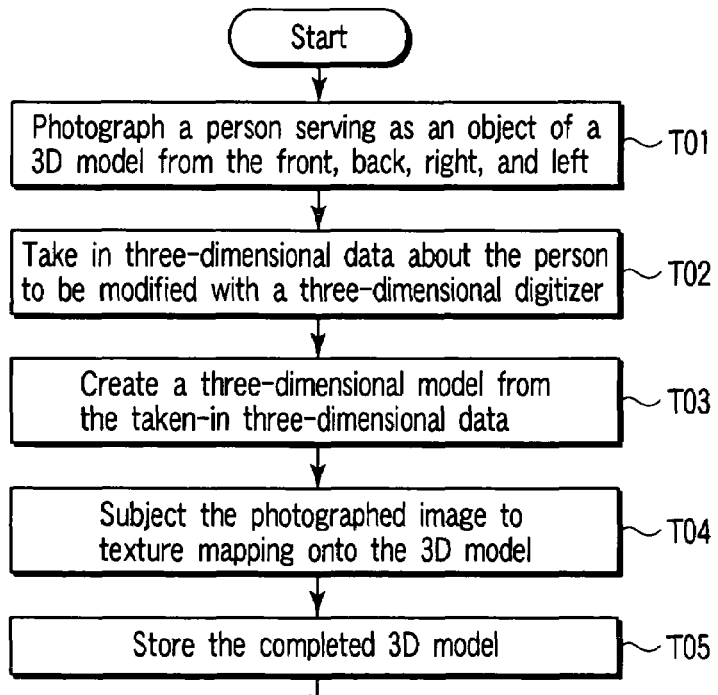
FIG. 3 is a flowchart to help explain the procedure for a 3D model creating process.

In step T01 of FIG. 3, a person serving as an object of a 3D model is photographed from around the person, for example, the front, back, right, and left. The photographed image is stored in the temporary memory 14.

Next, in step T02, using a three-dimensional digitizer (not shown), three-dimensional data about the person to be modified is taken in. The three-dimensional digitizer is a device which takes in three-dimensional data obtained by scanning a three-dimensional object, such as a part, a model, or the human body. Known methods of taking in three-dimensional data include a method of scanning a three-dimensional object while touching its surface and a method of scanning a three-dimensional object with light while making no contact with the surface of the object. The three-dimensional data from the three-dimensional digitizer is supplied via the communication interface 13 to the image processing apparatus 10 and then is stored in the 3D-model memory 18.

Then, in step T03, a 3D model is created from the three-dimensional data taken in. In the 3D model created as described above, only the shape of the three-dimensional object has been reproduced. Therefore, the pattern, colors, and the like have not been given. In step T04, the face image of the photographed person stored in the temporary memory 14 is subjected to texture mapping onto the 3D model. In step T05, the completed 3D model is stored in the 3D-model memory 18. Then, control returns.

Figure 4:
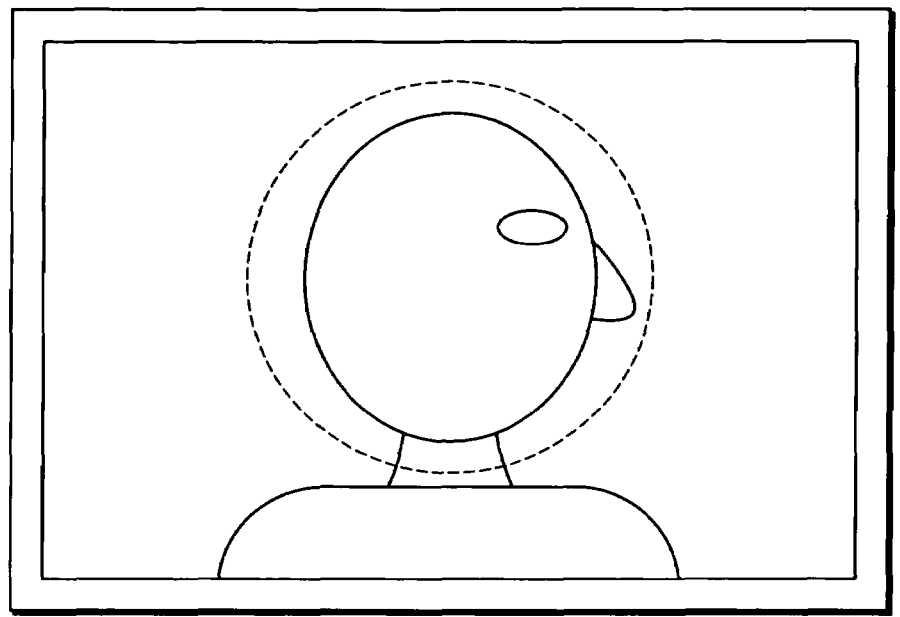
FIG. 4 is a diagram to help explain the clipping of a face part of the image to be modified.

To return to FIG. 2, in step S02, an image to be modified is read from the image memory 15. In step S03, the face part of the image to be modified is clipped. When the face part is clipped, the outline of the face need not be clipped accurately. For instance, as shown in FIG. 4, an area including the face part may be roughly specified with the mouse.

Next, in step S04 and step S05, it is determined from which direction and at what distance the created 3D model was photographed to obtain the clipped face part. To do this, the pattern matching between the image of the clipped face part and the 3D model is performed.

Figure 5:
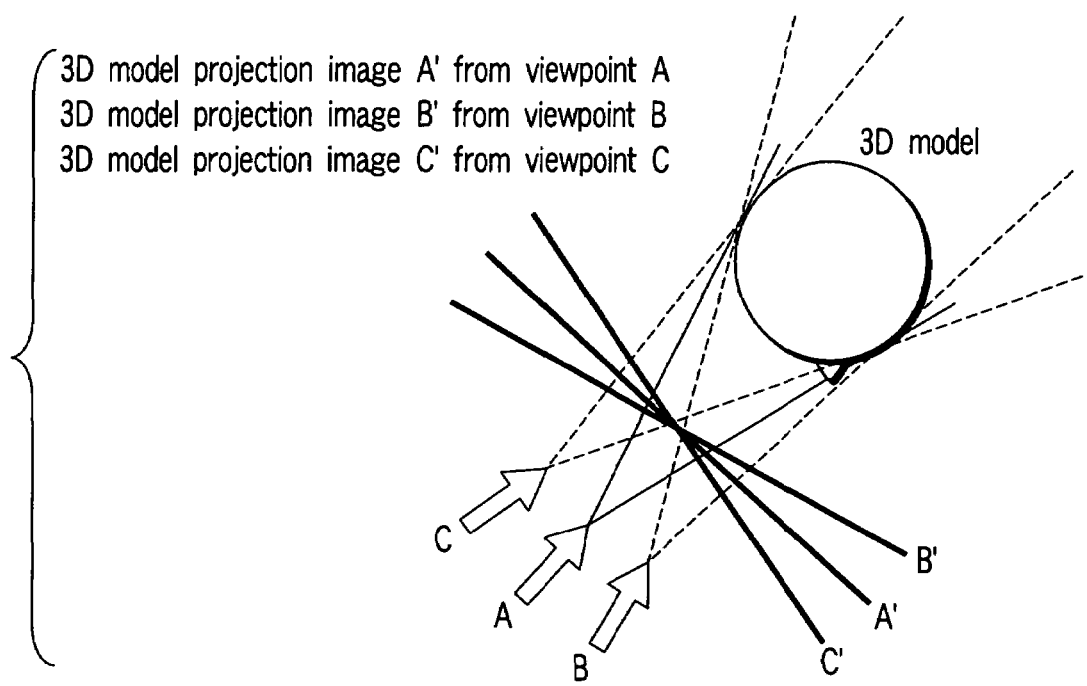
FIG. 5 is a diagram to help explain a pattern matching method.
Figure 6:
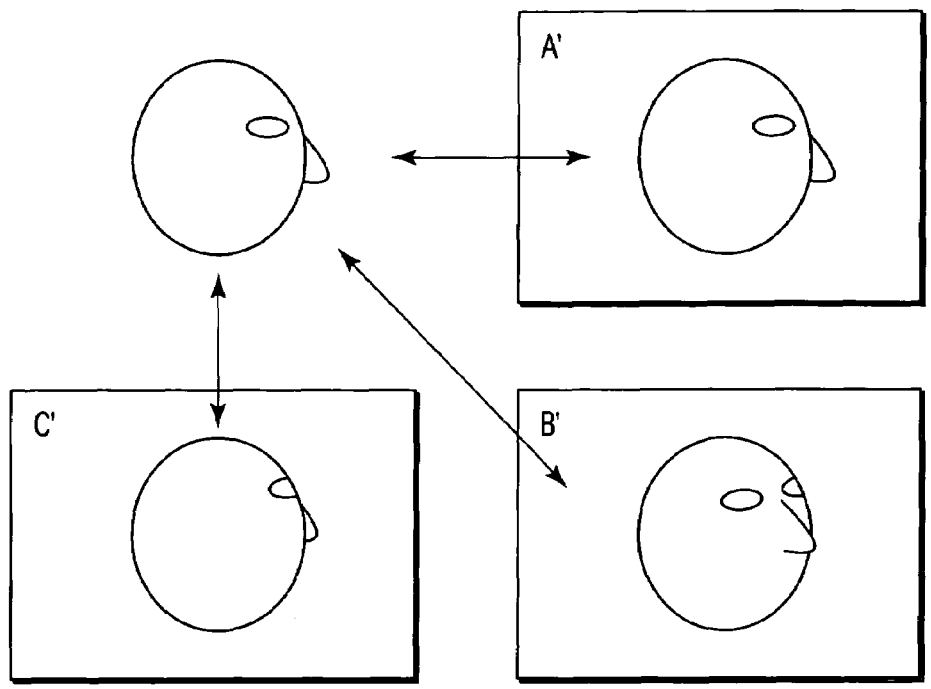
FIG. 6 is a diagram to help explain a pattern matching method.

FIGS. 5 and 6 are diagrams to help explain a pattern matching method. First, 3D-model projection images of a 3D model are obtained from a plurality of viewpoints. In FIG. 5, 3D-model projection images A', B', C' are obtained from viewpoints A, B, C. As shown in FIG. 6, of the 3D-model projection images A', B', C', the one which matches well with the image of the clipped face part is extracted by pattern matching. In FIG. 6, 3D-model projection image A' matches well with the image of the clipped face part. The pattern matching is performed repeatedly. From the result of the pattern matching, the shooting direction to the face, the shooting distance from the face, and the rotation angle of the frame are determined.

Figure 7A:
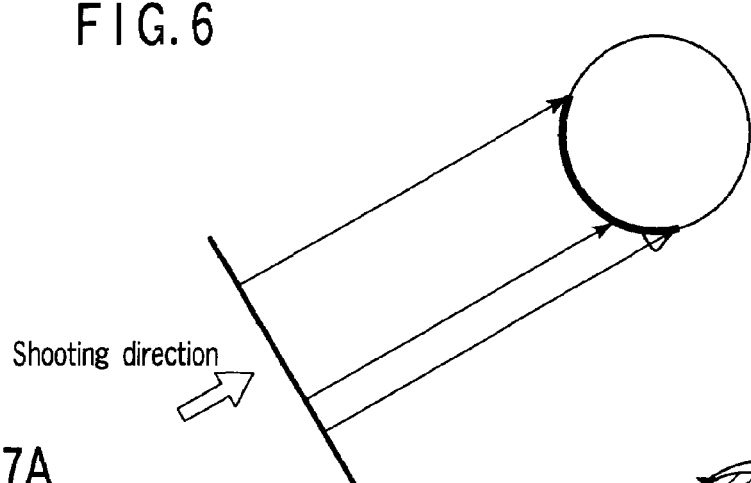
FIG. 7A is a diagram to help explain texture mapping.
Figure 7B:
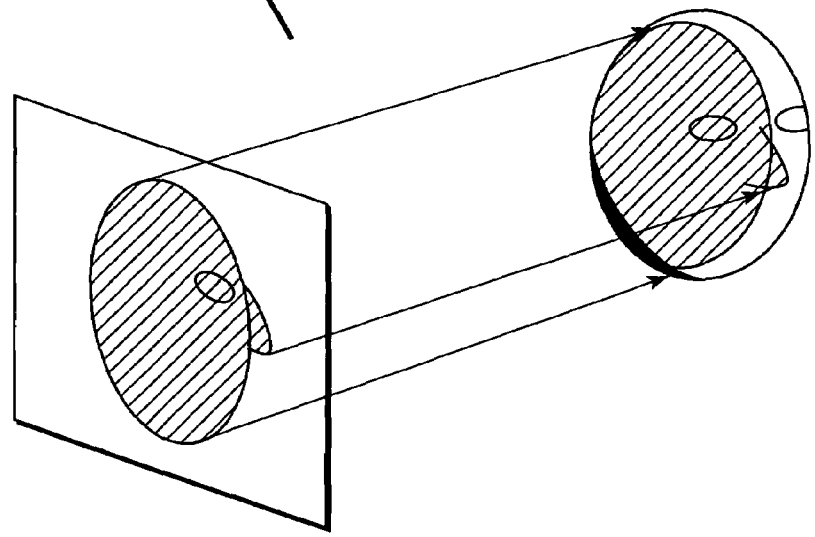
FIG. 7B is a diagram to help explain texture mapping.

Then, in step S06, the image of the clipped face part is subjected to texture mapping onto a 3D model on the basis of the shooting direction to the face, the shooting distance from the face, and the rotation angle of a frame which have been determined. FIG. 7A is a top view to help explain texture mapping and FIG. 7B is a perspective view to help explain texture mapping.

Next, a modifying process (FIG. 8) in step S07 is carried out. In the modifying process, as shown in FIG. 9, a 3D model X and a processing 3D model Y obtained by subjecting an image to be modified Z to texture mapping onto a copy of the 3D model X are used. The processing 3D model Y is transformed, interlocking with the transformation of the 3D model X.

Figure 8:
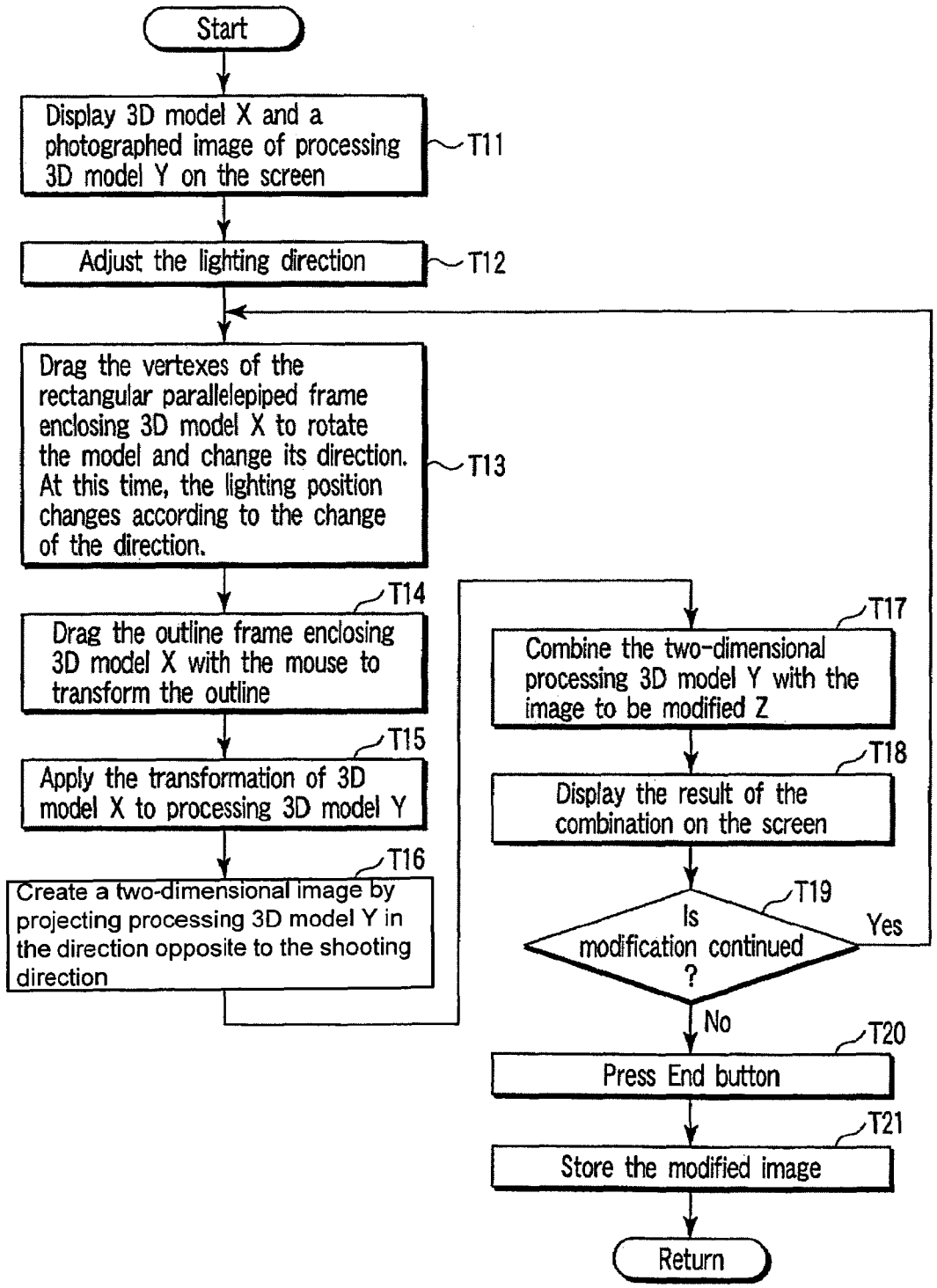
FIG. 8 is a flowchart to help explain the procedure for a modifying process.
Figure 9:
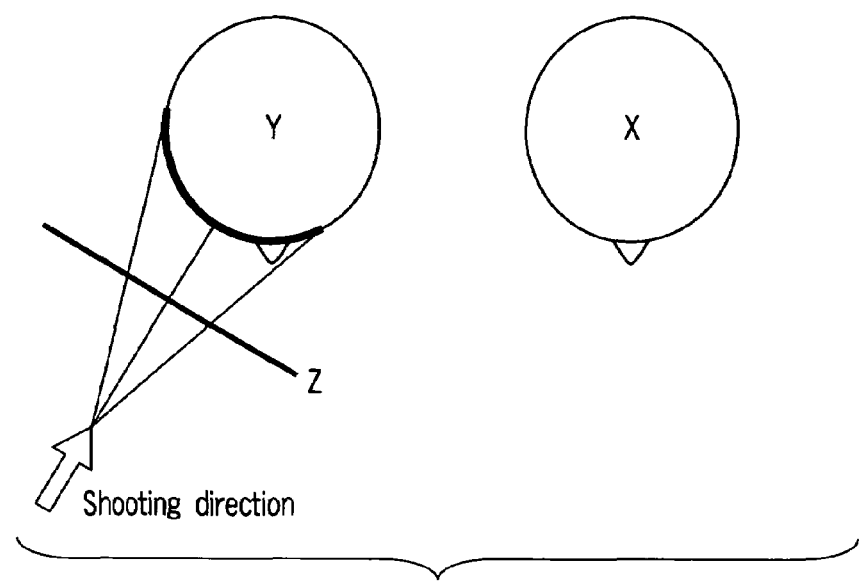
FIG. 9 shows a 3D model and its copy.

In step T11 and step T12 of FIG. 8, the 3D model X and the processing 3D model Y are displayed on the display section 11, thereby adjusting the lighting direction.

Figure 10:
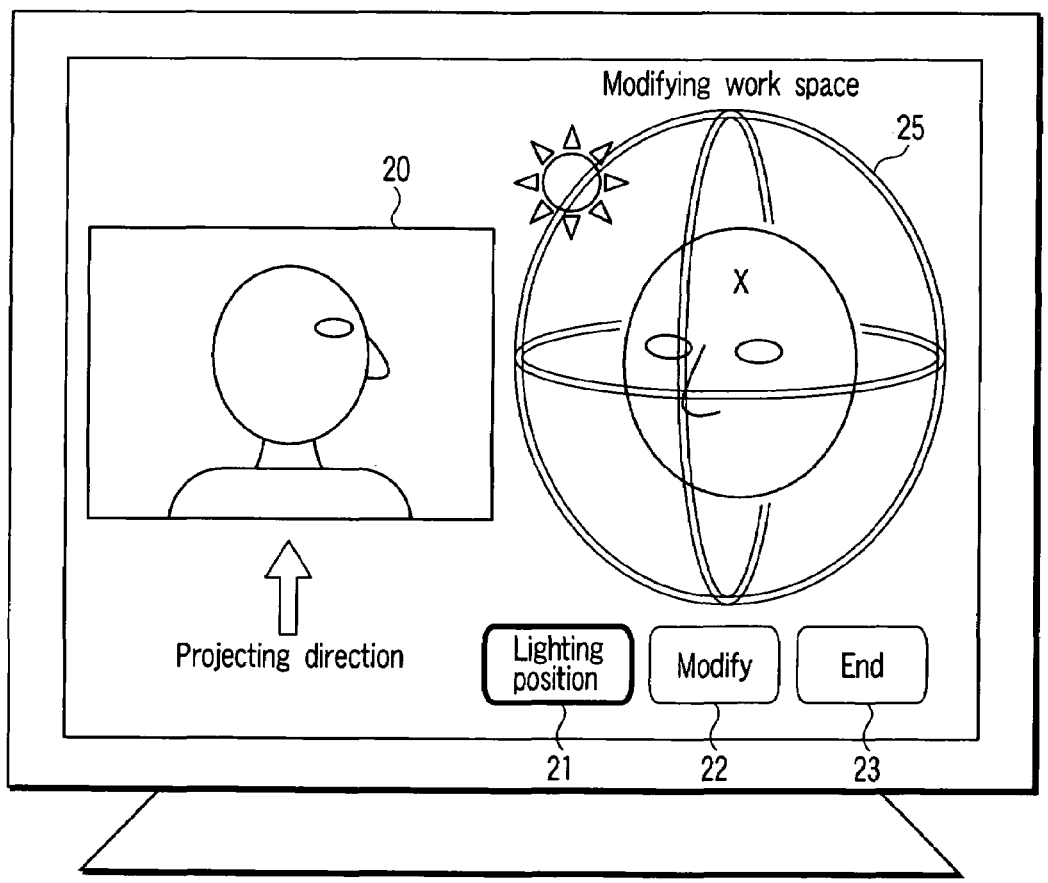
FIG. 10 shows a lighting position adjusting screen.

FIG. 10 shows a lighting position adjusting screen. On the right of the screen, the 3D model X is displayed. On the lift of the screen, an image 20 is displayed which is obtained by photographing the processing 3D model Y from the same direction as the image to be modified Z. When a lighting position button 21 displayed in the lower part of the screen is operated, a rotation frame 25 for adjusting the lighting direction of illumination is displayed together with a mark of the sun representing illumination. Illumination can be rotated in a three-dimensional space, with three axes in the frame crossing at right angles to one another as central axes. When the lighting position changes, the shadow of the model displayed on the image 20 is transformed, interlocking with the change of the lighting position. However, the direction in which the model is shot, the shooting distance, and the rotation angle of the frame do not change.

FIG. 11 shows a screen for modifying the 3D model. When a modify button 22 displayed in the lower part of the screen is operated, a rectangular parallelepiped frame 26 and an outline frame 27 which enclose the 3D model X are displayed.

In step T13 and step T14 of FIG. 8, the 3D model X can be rotated to change its direction by dragging the vertexes of the rectangular parallelepiped frame 26. At this time, the lighting position also changes, interlocking with the movement of the frame. Moreover, dragging the outline frame 27 enables the outline of the 3D model to be transformed. At this time, the shadow of the face also changes.

In step T15 to step T18 of FIG. 8, the processing 3D model Y is transformed, interlocking with the transformation of the 3D model X. Then, a two-dimensional face image is created by photographing the transformed processing 3D model Y from the same direction as the image to be modified Z (that is, in the direction opposite to the shooting). Thereafter, the created two-dimensional face image is combined with the image to be modified Z. The result of the combination is displayed on the image 20.

If YES in step T19, that is, if the modification is continued, step T13 to step T18 are carried out repeatedly. If NO in step T19, that is, if the modification is ended, operating an end button 23 in step T20 causes the modified image to be stored in the image memory 15 in step T21. Then, control returns.

To return to FIG. 2, in step S08, the modified image is created as a modified image of the original image to be modified Z and then is enlarged on the display section 11.

Second Embodiment

An image processing method according to a second embodiment of the present invention differs from the first embodiment in that a plurality of image-taking devices are used to create a 3D model. The same parts as those in the first embodiment are indicated by the same reference numerals and a detailed explanation of them will be omitted.

Figure 12:
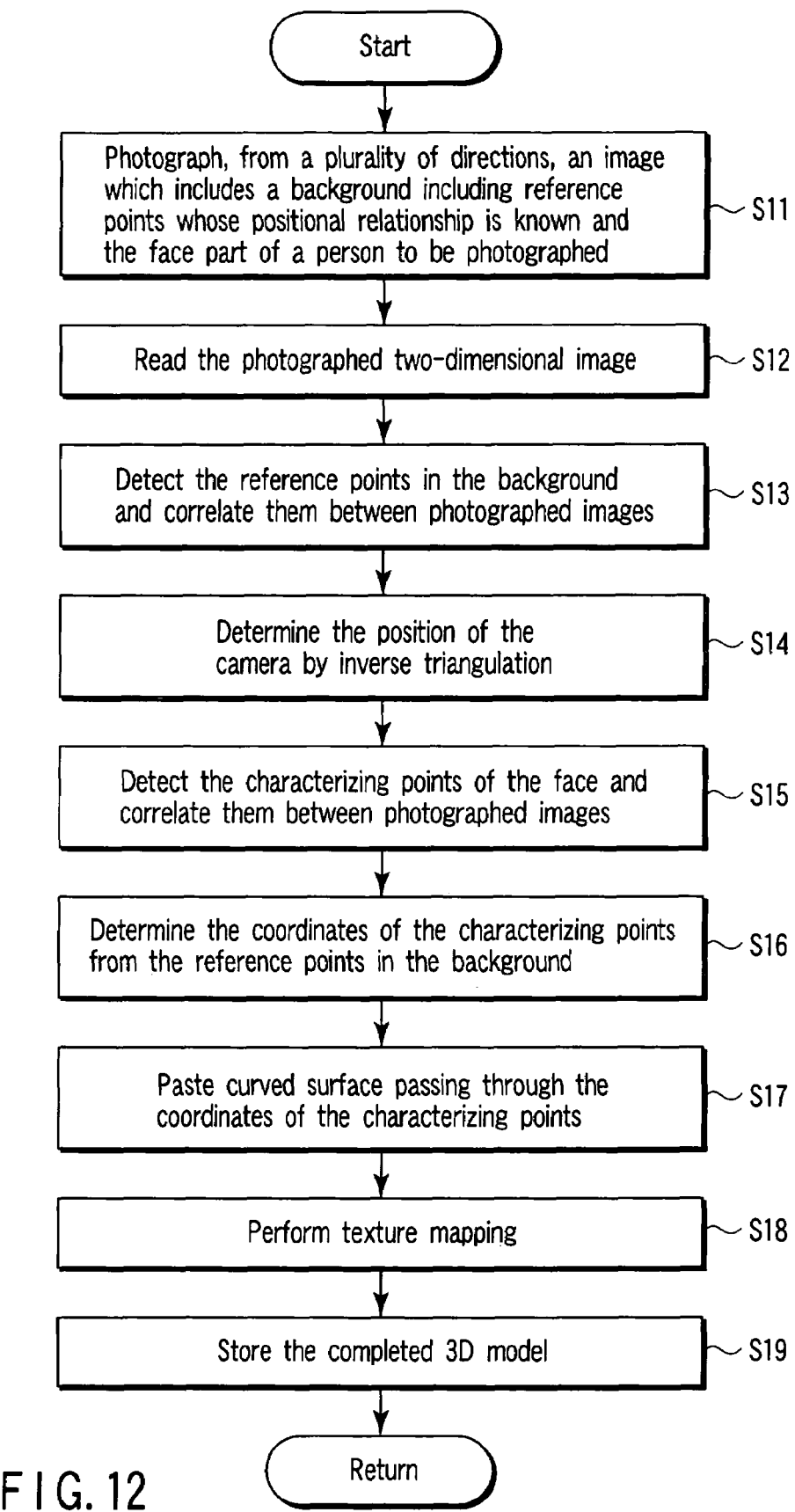
FIG. 12 is a flowchart to help explain the procedure for a 3D-model creating process.

FIG. 12 is a flowchart to help explain the procedure for a 3D-model creating process. The flowchart can be used in place of the 3D-model creating process of FIG. 8.

Figure 13:
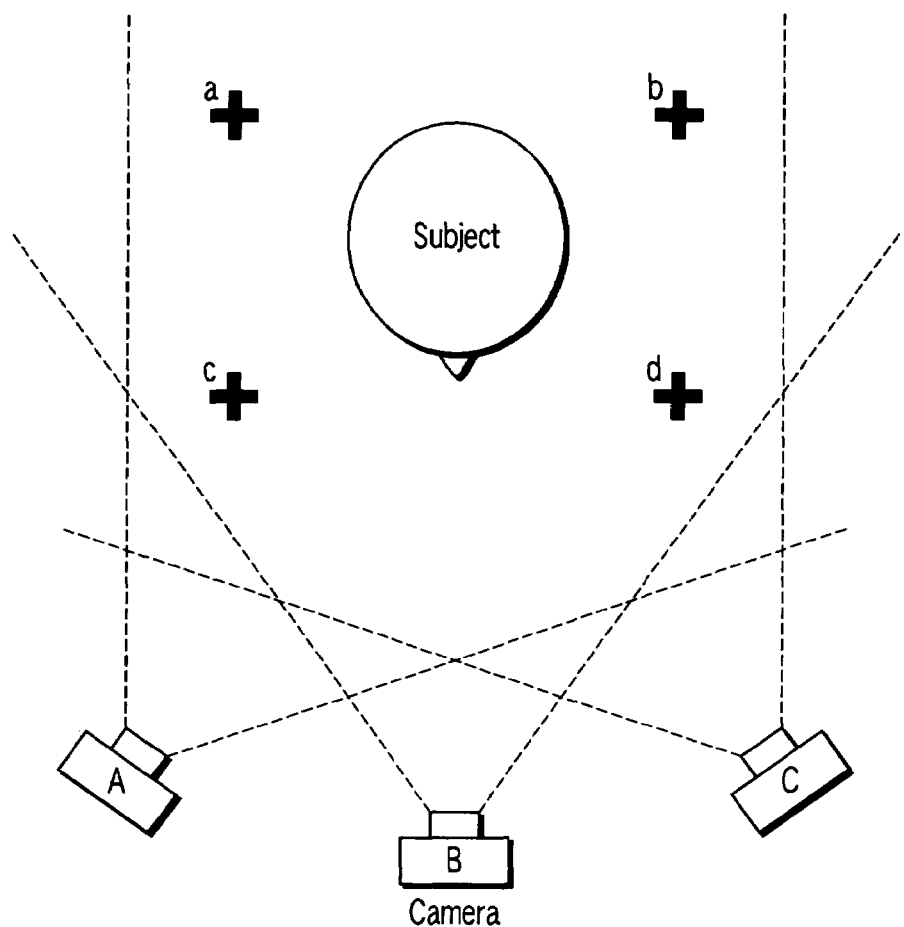
FIG. 13 shows the positional relationship between reference points, a subject, and image-taking devices.

In step S11 of FIG. 12, an image which includes a background including reference points whose positional relationship is known and the face part of a person to be photographed is photographed from a plurality of directions. FIG. 13 shows the positional relationship between the reference points a, b, c, d, the subject, and the image-taking devices A, B, C.

Figure 14:
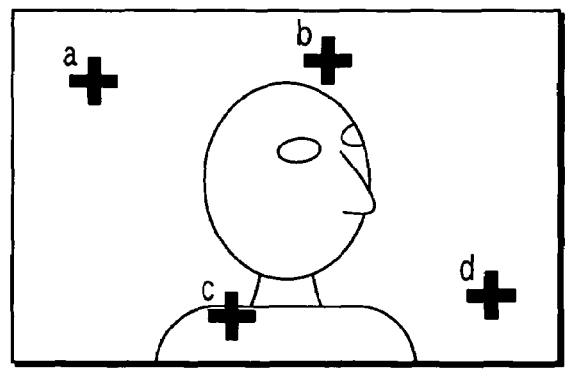
FIG. 14 shows an image photographed by the image-taking device.

In step S12 to step S14, the photographed two-dimensional image is read and the positions of the reference points in the two-dimensional image are determined. FIG. 14 shows an image photographed by the image-taking device. The positions of the reference points a, b, c, and d in the image and the relative distance between the reference points differ from those in an image taken by another image-taking device. This is because the position of the image-taking device which photographs the subject differs from the rest. Therefore, on the basis of the difference of the positions of the reference points between the photographed images, the position of each of the photographed images can be determined by triangulation.

In step S15 to step S17, the positions of the eyes, nose, mouth, and the like, that is, the characterizing portions of the face of the photographed image, are determined for each of the photographed images. Then, on the difference of their positions between photographed images, the positions of the characterizing points of the face in the space coordinates are determined. Next, a 3D model is created by pasting curved surfaces constituting a face passing through the coordinates of a plurality of characterizing points of the face. Since in the 3D model created this way, only the shape of the three-dimensional object has been reproduced, the pattern, colors, and the like have not been given. Therefore, in step S18, the image of the photographed subject is subjected to texture mapping onto the 3D model. Then, in step S19, the completed 3D model is stored.

According to the first and second embodiments, use of a 3D model enables a plurality of two-dimensional images to be modified in the same manner, which makes it unnecessary to carry out separate image processes. Moreover, using a 3D model makes it possible to transform the outline naturally and easily. In addition, in modifying a 3D model, the modifier can view the resulting image immediately after it is modified. As a result, the modifier can make modifications as he or she wants to.

Furthermore, according to the second embodiment, since a 3D model is created on the basis of the image of the photographed subject, there is no need to provide a three-dimensional digitizer.

Each of the functions explained in the embodiments may be configured using hardware. Alternatively, each of the functions may be realized by loading, into a computer, programs in which each function has been written using software. Moreover, each of the functions may be configured by selectively using either software or hardware suitably.

Furthermore, each of the functions may be realized by loading, into a computer, programs stored in a recording medium (not shown). In the recording medium of the embodiments, any recording method may be used, provided that programs can be recorded on the recording medium by the method and the computer can read the programs from the recording medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method used in an image processing apparatus which has a display for displaying an image and modifies a photographed image, the image processing method comprising:

creating a three-dimensional proto-model of a subject;

creating a three-dimensional model of the subject by projecting the subject portion of a photographed image on the surface of the three-dimensional proto-model and mapping the subject image onto the surface of the three-dimensional proto-model;

displaying the three-dimensional model of the subject obtained by mapping on the display;

transforming or modifying the shape of the three-dimensional model of the subject displayed on the display;

creating a two-dimensional modified subject image by projecting the image of the transformed or modified three-dimensional model of the subject in the direction opposite to the direction in which the photographed image is projected;

combining the two-dimensional modified subject image obtained by projecting the image in the opposite direction with the photographed image; and displaying the combined image as the modified photographed image on the display.

2. The image processing method according to claim 1, further comprising: changing a position in which the three-dimensional model displayed on the display is observed and then displaying the model.

3. The image processing method according to claim 2, further comprising: setting a lighting position in which the three-dimensional model displayed on the display is illuminated.

4. The image processing method according to claim 3, further comprising:

creating a copy of the created three-dimensional proto-model of the subject;

creating a three-dimensional copy model of the subject by projecting the subject portion of the photographed image to map the subject image onto the surface of the copy of the three-dimensional proto-model of the subject;

subjecting the three-dimensional copy model of the subject to the same transformation or modification as that of the three-dimensional model of the subject; and displaying the transformed or modified three-dimensional model of the subject and the transformed or modified three-dimensional copy model of the subject.

5. An image processing apparatus which has a display for displaying an image and modifies a photographed image, the image processing apparatus comprising:

a three-dimensional model creating section which creates a three-dimensional proto-model of a subject;

a projection section which projects the subject portion of a photographed image to map the image onto the surface of the three-dimensional proto-model of the subject;

a display section which displays on the display a three-dimensional model of the subject obtained by mapping;

a transforming section which transforms or modifies the shape of the three-dimensional model of the subject displayed on the display;

an inverse projection section which creates a two-dimensional modified subject image by projecting the image of the three-dimensional model of the subject transformed or modified at the transforming section in the direction opposite to the direction in which the photographed image is projected at the projection section;

an image combining section which combines the two-dimensional modified subject image obtained at the inverse projection section with the photographed image; and a result-of-process display section which displays the combined image at the image combining section on the display.

6. The image processing apparatus according to claim 5, wherein the display section changes a position in which the three-dimensional model of the subject is observed and displays the model.

7. The image processing apparatus according to claim 6, wherein the display section sets a lighting position in which the three-dimensional model of the subject is illuminated.

8. The image processing apparatus according to claim 7, further comprising:

a first copy section which creates a copy of the three-dimensional proto-model of the subject created at the three-dimensional model creating section;

a second copy section which creates a three-dimensional copy model of the subject by projecting the subject portion of the photographed image to map the subject image onto the surface of the copy of the three-dimensional proto-model of the subject created at the copy section; and a second transforming section which subjects the three-dimensional copy model of the subject to the same transformation or modification as that of the three-dimensional model of the subject, wherein the display section displays the transformed or modified three-dimensional model of the subject and the transformed or modified three-dimensional copy model of the subject.

9. A computer-readable storage medium encoded with computer-readable instructions for causing a computer, which is installed in an image processing apparatus that has a display for displaying an image and that modifies a photographed image, to execute:

a three-dimensional model creating step of creating a three-dimensional proto-model of a subject;

a projection step of projecting the subject portion of a photographed image to map the subject image onto the surface of the three-dimensional proto-model of the subject;

a displaying step of displaying on the display a three-dimensional model of the subject obtained by mapping;

a transforming step of transforming or modifying the shape of the three-dimensional model of the subject displayed on the display;

an inverse projection step of creating a two-dimensional modified subject image by projecting the image of the three-dimensional model of the subject transformed or modified at the transforming step in the direction opposite to the direction in which the photographed image is projected;

an image combining step of combining the two-dimensional modified subject image obtained in the inverse projection step with the photographed image; and a result-of-process displaying step of displaying the image combined in the image combining step on the display.

10. The computer-readable medium encoded with computer-readable instructions according to claim 9, wherein the displaying step is to change a position in which the three-dimensional model of the subject is observed and display the model.

11. The computer-readable medium encoded with computer-readable instructions according to claim 10, wherein the displaying step is to set a lighting position in which the three-dimensional model of the subject is illuminated.

12. The computer-readable medium encoded with computer-readable instructions according to claim 11, for causing the computer to further execute:

a first copy step of creating a copy of the three-dimensional proto-model of the subject created in the three-dimensional model creating step;

a second copy step of creating a three-dimensional copy model of the subject by projecting the subject portion of a photographed image to map the subject image onto the surface of the copy of the three-dimensional proto-model of the subject created in the copy step;

a second transforming step of subjecting the three-dimensional copy model of the subject to the same transformation or modification as that of the three-dimensional model of the subject; and a second displaying step of displaying the transformed or modified three-dimensional model of the subject and the transformed or modified the three-dimensional copy model of the subject.

* * * * *